Patented Aug. 4, 1936

2,049,524

UNITED STATES PATENT OFFICE 2,049,524

FERTILIZER AND PROCESS OF MAKING SAME

Albert G. Stillwell, Cos Cob, Conn.

No Drawing. Application August 18, 1933, Serial No. 685,740

16 Claims. (Cl. 71—6)

This invention relates to non-hygroscopic fertilizers and a method for producing same.

The invention also relates to a method of utilizing extensively produced by-product materials containing plant nutrient elements which materials are generally discarded as waste products having no value and transforming such waste materials cheaply into very valuable products capable of wide commercial and practical use.

Further the invention relates to a method of making fertilizers containing highly valuable nitrogen, potash, and, if desired, phosphoric acid, the relative amounts of which may be predetermined and accurately controlled within wide limits.

More specifically the invention relates to non-hygroscopic fertilizers containing the valuable plant nutrients hereinbefore mentioned and a method for making such fertilizers from solutions containing organic matter such as, for example, waste liquor produced in the manufacture of cane or beet sugar from molasses and in the manufacture of alcohols or the like and other solutions containing organic bodies having like characteristics or containing plant food elements. These liquors or solutions are hereinafter sometimes referred to as slop.

The invention consists in treating waste liquor or other solutions having intermixed therewith organic acids and other organic materials containing plant nutrients with a chemically reactive substance by which treatment the otherwise hygroscopic constituents may be transformed into non-hygroscopic compounds containing nitrogen and potash available as fertilizer.

Further, the invention consists in producing a non-hygroscopic fertilizer containing predetermined and fixed amounts of available phosphoric acid in addition to nitrogen and potash.

The invention also consists in forming a product having the general characteristics, the new and useful applications, and the several features of utility hereinafter set forth and claimed.

Also, the invention consists in the new and novel features of operation and the new and original arrangements and combinations of steps in the process hereinafter described and more particularly set forth in the claims.

The following more particular description is given for purposes of illustration and explanation but it will be understood that the details may be modified in various respects without departure from the broad aspect of the invention.

The waste liquor or slop resulting from the distillation process in the manufacture of alcohol from molasses contains highly valuable plant nutrients such as nitrogen and potash compounds but they are in such form as to be very hygroscopic and even when dried in such form absorb water again becoming sticky and unfit for convenient use as fertilizer.

To render these hygroscopic plant nutrient containing compounds available in a non-hygroscopic form and to produce a complete fertilizer, I reduce the slop to a specific gravity of about 30° to 32° on the Baumé scale at which concentration the water content ranges from about 47% to 53%.

To a ton of this concentrated slop is added 1800 pounds of super-phosphate of 16% available phosphoric acid content and 250 pounds of ammonium sulphate. These materials are charged into a steam jacketed mixer of suitable design. Steam is passed into the jacket and the mixture gradually heated and stirred. When thoroughly intermixed, anhydrous ammonia from a drum or other suitable source is added to the mixture.

Upon the introduction of the ammonia a chemical reaction takes place which in itself generates heat which tends to increase the temperature of the mass in addition to the heat supplied from the steam jacket. The quantity of steam passing into the jacket is adjusted to bring the temperature of the mix up to the neighborhood of 160° F. to 185° F., although in some cases I may carry the temperature higher. In the meantime, about 50 pounds, more or less, of ammonia are added to the mix comprised of a ton of slop, 250 pounds of ammonia sulphate and 1800 pounds of super-phosphate, although various amounts may be added depending upon the quantity of the different nutriments desired in the resultant product.

As the slop, super-phosphate and ammonia and ammonium sulphate is stirred and the temperature reaches the neighborhood aforementioned, the mixture changes from a viscous mass into a farinaceous condition resembling that of wet meal. When the mass is thus changed into this mealy condition it is immediately dumped. In some cases, however, I may prefer to carry the temperature higher and the reaction further.

The mixture in the mealy condition just described contains approximately 20% to 30% water and is now ready to be dehydrated. It may be dried naturally in the atmosphere or may be passed through a mechanical drier of suitable design.

After drying and grinding, if desired, the product thus formed containing approximately 40% water soluble organic matter, 3% nitrogen, 8% available phosphoric acid and 3% potash, is ready for use as a fertilizer. It is non-hygroscopic and will remain so indefinitely; it will not cake nor become sticky and will not segregate into its constituent ingredients upon standing or shaking.

While the precise nature of the chemical reaction which takes place is not altogether known to me, it is my belief that the ammonia in addition to increasing the nitrogen content of the finished product also neutralizes and changes these acids into final products which are non-hygroscopic and at the same time neutralizes any sulphuric acid which may be present in the slop if sulphuric acid was introduced during the process of alcohol manufacture. The farinaceous or mealy condition, I believe to be caused by a reaction between the super-phosphate and the ammonia in excess of that required in neutralizing the acids in the slop. The preferable, though not necessary, water concentration of the slop to bring about this mealy condition is within the limits hereinbefore set forth.

While a specific example of a preferred procedure has been described it is not intended so to confine the invention as it will be apparent that waste liquor or slop from alcohol distilleries or molasses desugarizing plants either using beets or cane as well as other solutions of like characteristics may be used as a raw material in the process contemplated by the invention. It will be further apparent that various percentages of ammonia may be used which may be anhydrous or aqueous and super-phosphate in various amounts and of different quantities of available phosphoric acid may be used. Or, if desired, ammoniated super-phosphate may be substituted for ordinary super-phosphate; in fact, any plant nutrient bearing raw materials such as for example, ammonium sulphate or other ammonia salts, or potash salts may be added or any inert material, such as for example, sand, the selection being dependent upon the percentages of the particular nutrients to be desired in balancing the finished fertilizer. I have found also that other nitrogen containing materials, such as for example, urea, may be used instead of or together with ammonia.

It is seen from the foregoing description that a waste product now generally discarded may be utilized in a very practical and economical manner which not only produces a complete fertilizer but which may have a very material effect on potash conservation. In addition to conservation of materials which might otherwise be discarded and thrown away, the invention contemplates a method by which non-hygroscopic fertilizers containing predetermined and controlled amounts of potash, nitrogen and phosphoric acid may be produced. Furthermore, the process is one in which the temperatures may be maintained sufficiently low to prevent the destruction of desirable organic compounds which is likely to follow where extreme heat is employed.

What is claimed is:

1. In the art of treating solutions of alcohol distillery waste containing plant nutrients in the form of hygroscopic compounds, the improved step which comprises mixing ammonia with said solution and heating only sufficiently to change said hygroscopic compounds into non-hygroscopic compounds.

2. A method of making fertilizer which consists in adding fertilizer material to a solution of alcohol distillery waste containing plant nutrient elements in the form of hygroscopic compounds, adding ammonia, heating only sufficiently to convert the nutrient elements into non-hygroscopic compounds, and drying the resultant product.

3. In the art of making a non-hygroscopic fertilizer the steps which comprise adding super-phosphate to alcohol distillery slop and adding anhydrous ammonia to the mixture, at a temperature sufficient to convert the mixture to a granular, non-hygroscopic mass.

4. The method of making a non-hygroscopic fertilizer from alcohol distillery slop which comprises treating the slop with ammonia, adding a fertilizer material containing further plant nutrients to form a granular mass and dehydrating the resultant product.

5. The process of making a non-hygroscopic fertilizer which comprises mixing alcohol distillery slop with super-phosphate, adding ammonia while simultaneously raising the temperature of the mixture with heat from an external source sufficiently to promote a reaction without destroying the organic ingredients of the slop, cutting off the external heat when the mixture is converted into a mealy condition, then drying the product thereby formed.

6. The process of making a non-hygroscopic fertilizer of predetermined plant nutrient content which comprises adding super-phosphate and ammonium sulphate in the ratio of approximately 1800 pounds and 250 pounds respectively to a ton of alcohol distillery slop, intermixing said super-phosphate, ammonium sulphate and slop, then adding anhydrous ammonia in the ratio of approximately 50 pounds to a ton of slop, heating to a temperature at which the mixture will be converted into a mealy mass but insufficient to destroy the organic compounds and drying said mealy mass.

7. In a process of making a non-hygroscopic fertilizer the steps which comprise adding super-phosphate to alcohol distillery slop, adding ammonia to the mixture and supplying external heat, raising the temperature to the neighborhood of 165° F. to 180° F., then dehydrating the product thereby formed.

8. The process of making a non-hygroscopic fertilizer which comprises mixing super-phosphate with alcohol distillery waste liquor adding ammonia to said mixture while simultaneously heating the mass thereby formed to a temperature not exceeding 180° F. and drying the resultant product.

9. A non-hygroscopic fertilizer comprised of a dried reaction product of ammonia and alcohol distillery slop.

10. As a new article of manufacture a fertilizer comprised of a dehydrated initially mealy reaction product of ammonia and alcohol distillery slop.

11. A fertilizer comprised of a dried initially mealy reaction product of alcohol distillery slop, super-phosphate and ammonia.

12. A fertilizer comprised of a dried initially mealy reaction product of alcohol distillery slop, super-phosphate and ammonia containing predetermined quantities of nitrogen, potash and phosphoric acid.

13. The process of making a fertilizer which comprises adding a material containing free ammonia to the waste liquor derived from the manufacture of cane or beet sugar from molasses, or from the manufacture of alcohols by distillation known as slop, and containing organic hygroscopic plant nutrients, and heating the mixture to a temperature below the destruction temperature of the organic constituents of the waste liquor whereby to convert the same into a non-hygroscopic, granular and farinaceous fertilizer.

14. The process of making a fertilizer which comprises adding a material containing free ammonia to waste liquor produced in the manufacture of alcohol or cane or beet sugar from molasses known as slop, and containing organic plant nutrients of an acidic and hygroscopic nature, and heating to an appropriate temperature below the destruction temperature of said organic nutrients to convert the same into a non-hygroscopic, farinaceous condition and then drying the resultant material to remove any excess moisture therefrom.

15. In the art of treating waste liquors from the manufacture of alcohol or sugar from molasses known as slop and containing plant nutrients in the form of hygroscopic compounds, the improved steps which comprise mixing ammonia with said slop and heating said mixture to change said hygroscopic compounds into non-hygroscopic compounds, said heating being carried out at temperature below 212° F.

16. A fertilizer comprised of a dried initially mealy reaction product of the waste liquor form derived from the manufacture of sugar from molasses or from the manufacture of alcohol by distillation known as slop, super-phosphate, ammonium sulphate and ammonia, containing predetermined quantities of nitrogen, potash and phosphoric acid.

ALBERT G. STILLWELL.